(12) United States Patent
Ucar et al.

(10) Patent No.: US 11,603,101 B2
(45) Date of Patent: Mar. 14, 2023

(54) SYSTEMS AND METHODS FOR VEHICLES RESOLVING A STANDOFF

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Chang-Heng Wang, Mountain View, CA (US); Dylan J. Lebedin, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 254 days.

(21) Appl. No.: 17/031,214

(22) Filed: Sep. 24, 2020

(65) Prior Publication Data

US 2022/0089162 A1    Mar. 24, 2022

(51) Int. Cl.
*B60W 30/18*    (2012.01)
*G06N 20/00*    (2019.01)

(52) U.S. Cl.
CPC .......... *B60W 30/18159* (2020.02); *B60W 30/18154* (2013.01); *G06N 20/00* (2019.01);
(Continued)

(58) Field of Classification Search
CPC ..... B60W 30/18159; B60W 30/18154; B60W 2556/50; B60W 2554/404
See application file for complete search history.

(56) References Cited

U.S. PATENT DOCUMENTS 9,928,746 B1    3/2018   MacNeille et al.
10,334,405 B2   6/2019   Mtintas et al.
(Continued)

FOREIGN PATENT DOCUMENTS

WO    2016058099 A1    4/2016

OTHER PUBLICATIONS

Roy et al., "Traffic Deadlock Resolution System using Internet of Vehicles", International Journal of Innovative Technology and Exploring Engineering (IJITEE), vol. 8, Jul. 2019, pp. 3041-3047.
(Continued)

*Primary Examiner* — Peter D Nolan
*Assistant Examiner* — Mikko Okechukwu Obioha
(74) *Attorney, Agent, or Firm* — Christopher G. Darrow; Darrow Mustafa PC

(57) ABSTRACT

System, methods, and other embodiments described herein relate to resolving a standoff by a vehicle. In one embodiment, a method includes generating a happens-before relationship that explains events between the vehicle and other vehicles before the standoff. The standoff may be a dispute for a right of way between the vehicle and the other vehicles. The method also includes identifying the standoff using a causality relationship analysis according to the happens-before relationship. The method also includes generating a mitigation plan for the standoff that forms standoff solutions in association with the standoff being similar to a prior standoff. The method also includes resolving the standoff by causing vehicle maneuvers associated with the vehicle according to the standoff solutions.

20 Claims, 6 Drawing Sheets

(52) U.S. Cl.
CPC ... *B60W 2554/404* (2020.02); *B60W 2556/50* (2020.02); *B60W 2556/65* (2020.02)

(56) References Cited

U.S. PATENT DOCUMENTS

| | | | |
|---|---|---|---|
| 10,587,998 B2 | 3/2020 | Mtintas et al. | |
| 2018/0146323 A1 | 5/2018 | Tseng et al. | |
| 2019/0051159 A1* | 2/2019 | Wang | G05D 1/0088 |
| 2019/0130739 A1 | 5/2019 | Khedkar et al. | |
| 2019/0132819 A1 | 5/2019 | Tseng et al. | |
| 2019/0311616 A1* | 10/2019 | Jin | G05D 1/0297 |
| 2020/0023842 A1* | 1/2020 | Gutierrez | B60W 50/14 |
| 2020/0169605 A1 | 5/2020 | Higuchi et al. | |
| 2020/0193811 A1* | 6/2020 | Zagajac | G08G 1/161 |
| 2020/0226921 A1 | 7/2020 | Higuchi et al. | |
| 2020/0257298 A1 | 8/2020 | Ucar et al. | |
| 2021/0394792 A1* | 12/2021 | Ahmad | G08G 1/161 |
| 2021/0407284 A1* | 12/2021 | Li | G08G 1/0116 |

OTHER PUBLICATIONS

Bouton et al., "Cooperation-Aware Reinforcement Learning for Merging in Dense Traffic", 2019 IEEE Intelligent Transportation Systems Conference (ITSC), Auckland, New Zealand, 2019, pp. 3441-3447.

Lu et al., "Autonomous and Connected Intersection Crossing Traffic Management using Discrete-time Occupancies Trajectory", Appl Intell 49, May 15, 2019, pp. 1-34.

Mukherji et al., "Deadlocks and Waiting Times in Traffic Jams", Physica A: Statistical Mechanics and its Applications, vol. 245, Nov. 1997, pp. 534-542.

Castelli et al., "Autonomous navigation for low-altitude UAVs in urban areas", Feb. 25, 2016, pp. 1-6, arXiv:1602.08141v1.

David Isele, "Interactive Decision Making for Autonomous Vehicles in Dense Traffic", Sep. 27, 2019, pp. 1-6, arXiv:1909.12914V1.

Qiang Lu, "Safe and efficient intersection control of connected and autonomous intersection traffic", Jan. 29, 2018, 104 pages, arXiv:1801.09361v1.

* cited by examiner

SYSTEMS AND METHODS FOR VEHICLES RESOLVING A STANDOFF

TECHNICAL FIELD

The subject matter described herein relates, in general, to resolving a standoff between vehicles, and, more particularly, to using a connected vehicle network to resolve a standoff using a happens-before relationship.

BACKGROUND

Vehicles in an intelligent transportation system (ITS) may be without egress during certain traffic jams. For example, a vehicle may encounter a scenario of a narrow road with vehicles parked or stationary on both sides. A vehicle operator or automated driving system (ADS) may follow certain rules to exit and continue travel. For example, an operator may give the right of way to oncoming vehicles according to the position of parked vehicles. However, an operator or ADS may find the application of driving rules challenging resulting in unresolvable disputes with other vehicles on the road.

Furthermore, in such circumstances, two vehicles may stop in the middle of the road resulting in a standoff. A standoff may be a deadlock between two equally matched opponents in a dispute. An operator or vehicle system may have difficulty resolving a standoff situation due to operating parameters, such as the right of way rules, related to vehicles.

In addition, a vehicle system may use peer-to-peer communication, such as vehicle-to-vehicle (V2V), to form a connected vehicle network to resolve a standoff. For example, the vehicle system may share information between vehicles concerning parameters related to the standoff. However, generating standoff solutions to egress from a standoff expediently remains elusive.

SUMMARY

In one embodiment, example systems and methods relate to a manner of resolving a standoff between vehicles to improve traffic congestion. In one approach, a standoff may be a deadlock between two similar opponents in a dispute. In various implementations, an intelligent transportation system (ITS) using current solutions may not expediently resolve a standoff due to a lack of coordination between vehicles or overreliance on operators. Accordingly, current ITS solutions for standoff may increase traffic congestion and frustrate operators, particularly in high volume vehicle areas. Therefore, in one embodiment, a control system may analyze a vehicular environment for a standoff between vehicles and provide vehicle actions to resolve the standoff. The control system may automatically detect the standoff and form a connected vehicle network, such as a vehicular micro-cloud, of vehicles associated with the standoff. In one approach, the vehicles of a vehicular micro-cloud may cooperatively share and collect information to resolve the standoff by each executing a causality relationship analysis for the standoff. The causality relationship analysis may use a happens-before relationship(s) between vehicles in the network to identify and expediently resolve the standoff. The happens-before relationship(s) may explain an event(s) that happened resulting in the standoff and identify a right of way for a vehicle(s).

Furthermore, the control system may generate a mitigation plan to form standoff solutions including vehicle actions or maneuvers to resolve the standoff according to certain parameters or constraints. The control system may use intrinsic parameter information of operator related information and extrinsic parameter information related to the vehicular environment. The control system may also modify the mitigation plan and associated standoff solutions using prior standoff solutions that represent potential solutions for resolving the standoff by operator(s) or automated driving system (ADS) actions. The system may modify the standoff solutions when the standoff is similar to a prior standoff. In one approach, the control system may use a machine learning model to modify the standoff solutions by analyzing previously accepted or rejected vehicle actions or driver actions of the prior standoff. In this way, the control system may provide standoff solutions with a high likelihood of resolving the standoff and thereby resolving the conflicts or the deadlock.

In one embodiment, a control system for resolving a standoff by a vehicle is disclosed. The control system includes one or more processors and a memory communicably coupled to the one or more processors. The memory stores a control module including instructions that when executed by the one or more processors cause the one or more processors to generate a happens-before relationship that explains events between the vehicle and other vehicles before the standoff, wherein the standoff is a dispute for a right of way between the vehicle and the other vehicles. The memory also stores an analysis module including instructions that when executed by the one or more processors cause the one or more processors to identify the standoff using a causality relationship analysis according to the happens-before relationship. The analysis module also includes instructions to generate a mitigation plan for the standoff that forms standoff solutions in association with the standoff being similar to a prior standoff. The analysis module also includes instructions to resolve the standoff by causing vehicle maneuvers associated with the vehicle according to the standoff solutions.

In one embodiment, a non-transitory computer-readable medium for resolving a standoff by a vehicle and including instructions that when executed by one or more processors cause the one or more processors to perform one or more functions is disclosed. The instructions include instructions to generate a happens-before relationship that explains events between the vehicle and other vehicles before the standoff, wherein the standoff is a dispute for a right of way between the vehicle and the other vehicles. The instructions also include instructions to identify the standoff using a causality relationship analysis according to the happens-before relationship. The instructions also include instructions to generate a mitigation plan for the standoff that forms standoff solutions in association with the standoff being similar to a prior standoff. The instructions also include instructions to resolve the standoff by causing vehicle maneuvers associated with the vehicle according to the standoff solutions.

In one embodiment, a method for resolving a standoff by a vehicle is disclosed. In one embodiment, the method includes generating a happens-before relationship that explains events between the vehicle and other vehicles before the standoff, wherein the standoff is a dispute for a right of way between the vehicle and the other vehicles. The method also includes identifying the standoff using a causality relationship analysis according to the happens-before relationship. The method also includes generating a mitigation plan for the standoff that forms standoff solutions in association with the standoff being similar to a prior standoff. The method also includes resolving the standoff by causing vehicle maneuvers associated with the vehicle according to the standoff solutions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
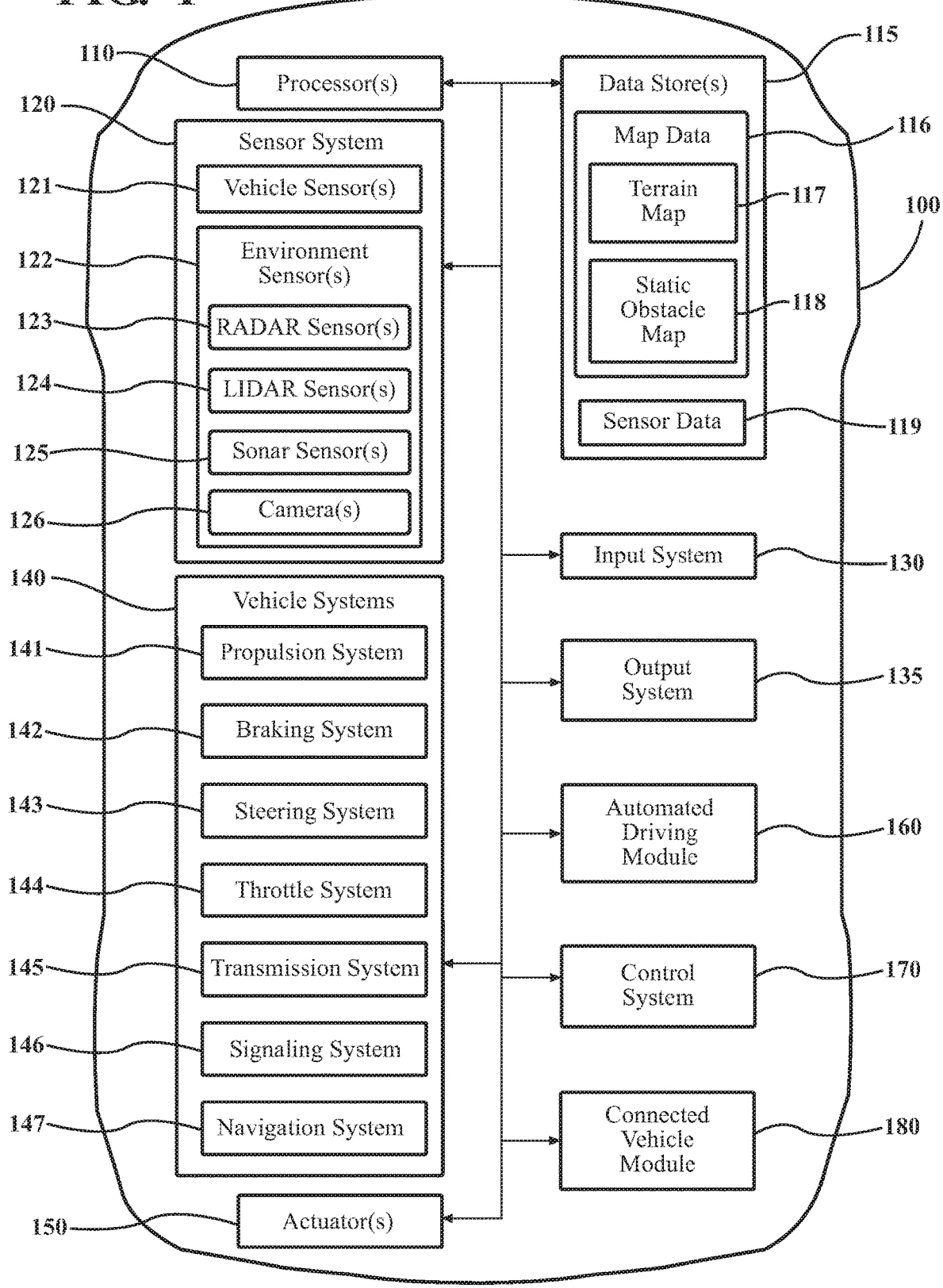
FIG. 1 illustrates one embodiment of a vehicle within which systems and methods disclosed herein may be implemented.

Systems, methods, and other embodiments associated with resolving a standoff between vehicles using a connected vehicle network and a happens-before relationship are disclosed herein. A control system may use a connected vehicle network and analyze a vehicular environment to resolve a standoff between vehicles. In one approach, the connected vehicles may cooperate by sharing parameters and observation data to resolve the standoff using a causality relationship analysis. The vehicles may be involved or proximate to the standoff. The causality relationship analysis may use the happens-before relationship(s) shared between vehicles associated via the connected vehicle network. The happens-before relationship(s) may explain an event(s) that happened resulting in the standoff and identify a right of way for a vehicle(s). For example, an event may be a vehicle route or a maneuver. The causality relationship analysis may use the happens-before relationship(s) between vehicles to identify properties and features of the standoff for a resolution. In this way, vehicles in a standoff share information or use crowd-sourced data from other vehicles to improve the reliability and effectiveness of standoff solutions.

Furthermore, vehicles in a standoff may generate a mitigation plan that forms standoff solutions. The standoff solutions may include vehicle actions to resolve the standoff. For example, a vehicle(s) may use the standoff solutions by following a series of vehicle actions to resolve the standoff. An operator(s) or an automated driving system (ADS) may perform a vehicle action. Vehicles may resolve the standoff by each taking a vehicle action that includes a driving action, a vehicle maneuver, or vehicle signaling. In addition, the control system may form the standoff solutions and adapt vehicle actions using intrinsic parameters, extrinsic parameters, or server information associated with the vehicles in the standoff. In this way, the control system may provide standoff solutions with a high likelihood of resolving the standoff and thereby reducing traffic.

In one approach, a vehicle may modify the standoff solutions using prior standoff solutions that represent potential solutions for resolving the standoff when the standoff is similar to a prior standoff. For example, a machine learning model may adapt generated standoff solutions according to similarly accepted or rejected prior standoff solutions. The control system may also use the machine learning model to generate a tree with nodes of vehicle actions that adapt according to the completion status of a vehicle action. Furthermore, the vehicle may use the connected vehicle network to share the generated tree or the next vehicle action to other vehicles to expedite the resolution of the standoff.

In addition, the control system may display or communicate the vehicle actions according to the standoff solutions for the vehicle, other vehicles, or operators to accept or reject. If accepted, the vehicle, other vehicles, or operators take maneuvers and resolve the standoff. If rejected, the control system may propose other vehicle actions or restart.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device used for motorized transport.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a control system 170 that is implemented to perform methods and other functions as disclosed herein relating to using a connected vehicle network to resolve a standoff using a happens-before relationship. As will be discussed in greater detail subsequently, the control system 170, in various embodiments, is implemented partially within the vehicle 100, and as a cloud-based service. For example, in one approach, functionality associated with at least one module of the control system 170 is implemented within the vehicle 100 while further functionality is implemented within a cloud-based computing system.

With reference to FIG. 1, one embodiment of the control system 170 of FIG. 1 is further illustrated. The control system 170 is shown as including a processor 110 from the vehicle 100 of FIG. 1. Accordingly, the processor 110 may be a part of the control system 170, the control system 170 may include a separate processor from the processor 110 of the vehicle 100, or the control system 170 may access the processor 110 through a data bus or another communication path. In one embodiment, the control system 170 includes a memory 210 that stores a control module 220 and an analysis module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 2:
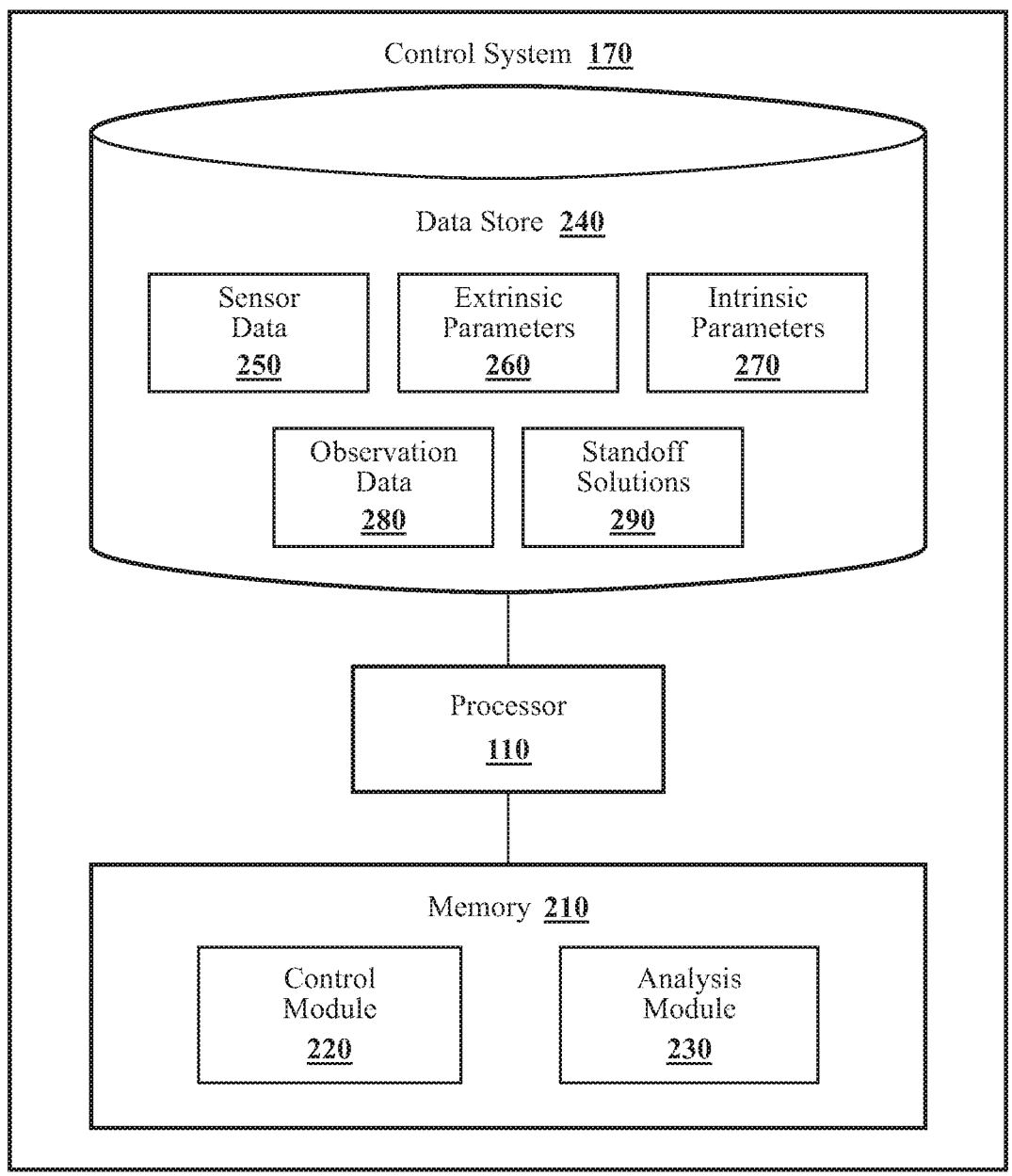
FIG. 2 illustrates one embodiment of a control system that is associated with resolving a standoff between vehicles.

With reference to FIG. 2, the control module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the control module 220, in one embodiment, acquires sensor data 250 that includes at least camera images. In further arrangements, the control module 220 acquires the sensor data 250 from further sensors such as a radar sensor 123, a light detection and ranging (LIDAR) sensor 124, and other sensors as may be suitable for identifying vehicles and locations of the vehicles.

Accordingly, the control module 220, in one embodiment, controls the respective sensors to provide the data inputs in the form of the sensor data 250. Additionally, while the control module 220 is discussed as controlling the various sensors to provide the sensor data 250, in one or more embodiments, the control module 220 can employ other techniques to acquire the sensor data 250 that are either active or passive. For example, the control module 220 may passively sniff the sensor data 250 from a stream of electronic information provided by the various sensors to further components within the vehicle 100. Moreover, the control module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the control system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, the data store 240 further includes the sensor data 250, the extrinsic parameters 260, the intrinsic parameters 270, the observation data 280, and the standoff solutions 290. In one approach, the sensor data 250 may include camera images, radar data, LIDAR data, and so on for identifying vehicles and locations of the vehicles. In one approach, the control system 170 may use the sensor data 250 to determine the extrinsic parameters 260, the intrinsic parameters 270, or the observation data 280. Examples of the extrinsic parameters 260 may include environmental factors such as a road geometry, a road status, an arrival time, an entry time, traffic conditions, and so on. Examples of intrinsic parameters 270 may include a driver experience level, driver hospitality, driver willingness, and so on. Furthermore, as explained herein, the observation data 280 may include the happens-before relationship(s) and other determined events to solve or resolve the standoff. The happens-before relationship may explain an event(s) that happened resulting in the standoff and identify a right of way for a vehicle(s). For example, an event may be a vehicle route or a maneuver.

Regarding the control module 220, in one embodiment the control module 220 includes instructions that cause the processor 110 to generate the happens-before relationship associated with a standoff involving the vehicle 100. As explained herein, the standoff may be a dispute for a right of way between the vehicle 100 and the other vehicles. Furthermore, the analysis module 230 includes instructions that cause the processor 110 to identify the standoff using a causality relationship analysis. In one approach, the control system 170 may determine patterns, sequences, and so on of events using the causality relationship analysis.

Moreover, the causality relationship analysis may involve analyzing events in the happens-before relationship, such as those related to the right of way, to resolve the standoff. In one approach, the happens-before relationship may be temporal. Accordingly, the vehicle 100 may use a clock to periodically record events and vehicles collaboratively run the happens-before relationship analysis through a vehicular micro-cloud. In certain configurations, the vehicular micro-cloud elects a cloud leader, such as a vehicle with the most connections or the most resources, to execute the happens-before relationship by requesting the recorded events from members of the vehicular micro-cloud.

In certain configurations, the vehicle 100 may complete a happens-before relationship through logical clocks. In this approach, the vehicular micro-cloud may execute a happens-before relationship without a clock or connections with the vehicles in the standoff. In this scenario, the cloud leader, such as vehicle 100, may request assistance by querying an edge or a cloud server. A server may return the recorded events such as a video of stopping at the traffic light, other connected vehicles recording logs, and so on to the cloud leader. The vehicle 100 or another cloud leader may analyze the retrieved records using a causality relationship analysis. The causality relationship analysis may predict the cause and effect of the event sequences or flows. For example, the vehicle 100 may predict the happens-before relationship by knowing the speed and location of the vehicles in a certain location associated with the standoff.

In addition, the vehicle 100 may form a vehicular micro-cloud and function as the cloud leader with another vehicle in a standoff. However, both of the vehicles may lack event recordings using clocks. As such, the vehicles cannot determine a happens-before relationship using a clock. The vehicle 100 may subsequently request more information from other connected vehicles in the vicinity or from an edge or a cloud server. As the cloud leader, the vehicle 100 may receive information about other vehicles such as speed, location, acceleration, road geometry, road traffic signs, traffic flow, density, and so on. The vehicle may then correlate the information to analyze the cause and effect. For example, the vehicle 100 may analyze the road geometry and find that a vehicle is coming from a certain intersection. This intersection may require a no turn on red. In this scenario, the vehicles cannot arrive to the standoff location before the vehicle 100 by considering the traffic density and the speed or the acceleration. Accordingly, the vehicle 100 determines that the optimal solution is owning the right of way. In this way, the vehicular micro-cloud creates a logical clock by leveraging the recorded events of standoff participants.

Returning to FIG. 2, the analysis module 230 may generate a mitigation plan for the standoff by the formation of the standoff solutions 290. One or more standoff solutions may be a series of vehicle actions where each vehicle action may include any one of a driving action, a vehicle maneuver, driving maneuvers, vehicle signaling, and so on for the vehicle 100 and at least one other vehicle to resolve the standoff. An operator(s), an ADS, and so on may perform a vehicle action. A vehicle action may be turn left, turn right, brake, and so on for a road or area having parked or immobile vehicles involved in the standoff. Furthermore, in one approach the analysis module 230 generates the mitigation plan using the extrinsic parameters 260, the intrinsic parameters 270, or a machine learning model. The machine learning model may improve actions of the standoff solutions 290 and thereby improving the likelihood of resolving the standoff. Moreover, the control system 170 improving vehicle actions may result in operators more likely to cooperate or negotiate to expediently resolve the standoff.

As further explained herein, the control system 170 or the analysis module 230 may use a machine learning model, such as a convolutional neural network (CNN) to improve the standoff solutions 290 by suggesting or removing vehicle actions. Of course, in further aspects, the control system 170 or the analysis module 230 may employ different machine learning models or implements different approaches for performing the associated functions, which can include deep convolutional encoder-decoder architectures.

Figure 3:
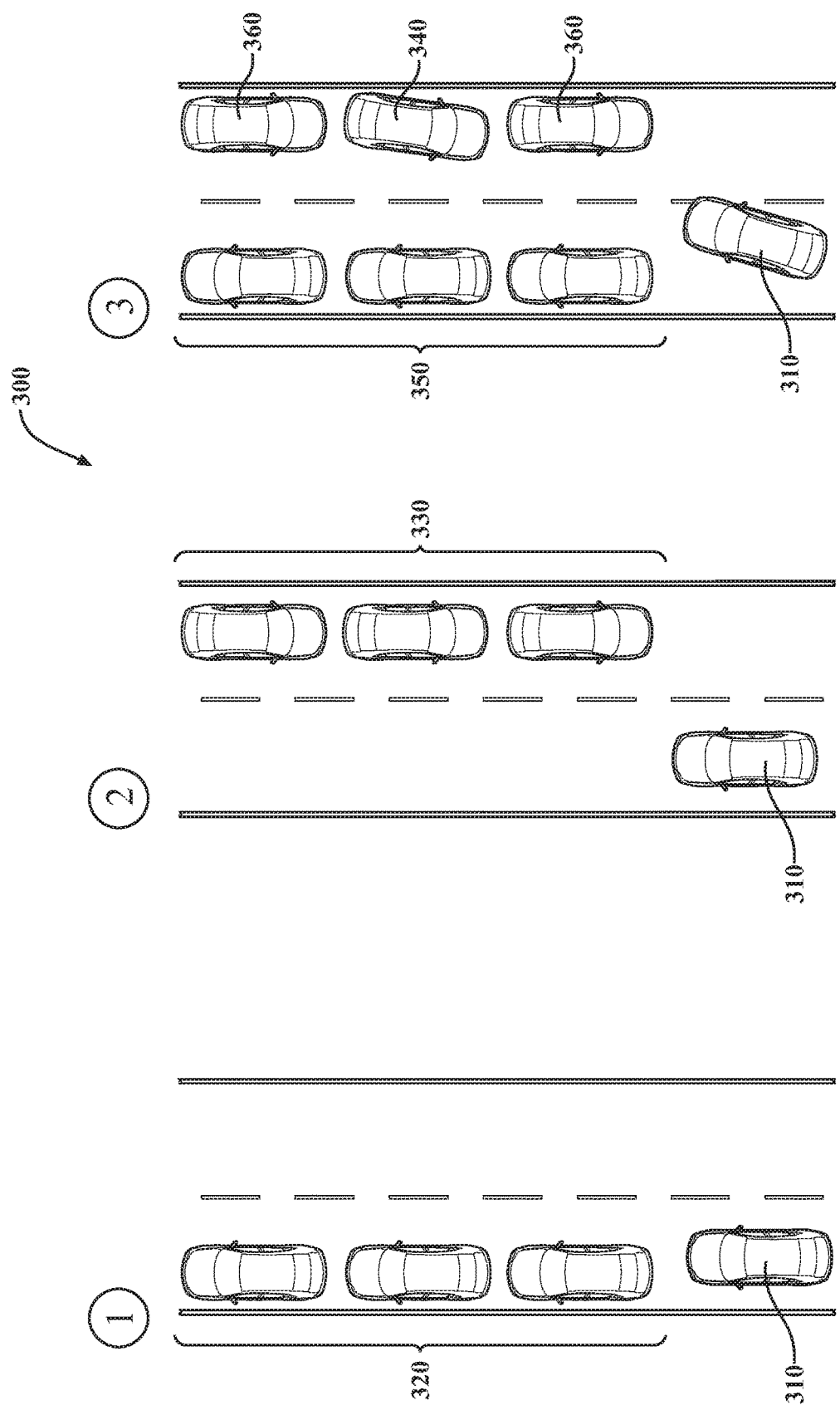
FIG. 3 illustrates an example of a right of way and vehicle maneuvers that result in a standoff.

FIG. 3 illustrates an example 300 of a right of way and vehicle maneuvers that result in a standoff. In environment #1, the vehicle 310 may wait behind the parked or immobile vehicles 320 to give way to oncoming vehicles. In environment #2, the vehicle 310 has the right of way and accordingly may pass the parked or immobile vehicles 330 on the right. However, in environment #3 a standoff is created since neither the vehicle 310 or 340 has the right of way since there are the parked or immobile vehicles 350 on the left and the parked or immobile vehicles 360 on the right. Accordingly, a solution involving vehicle actions or instructions for the vehicle 310 or 340 can resolve the standoff and thereby prevent congestion in environment #3.

Figure 4:
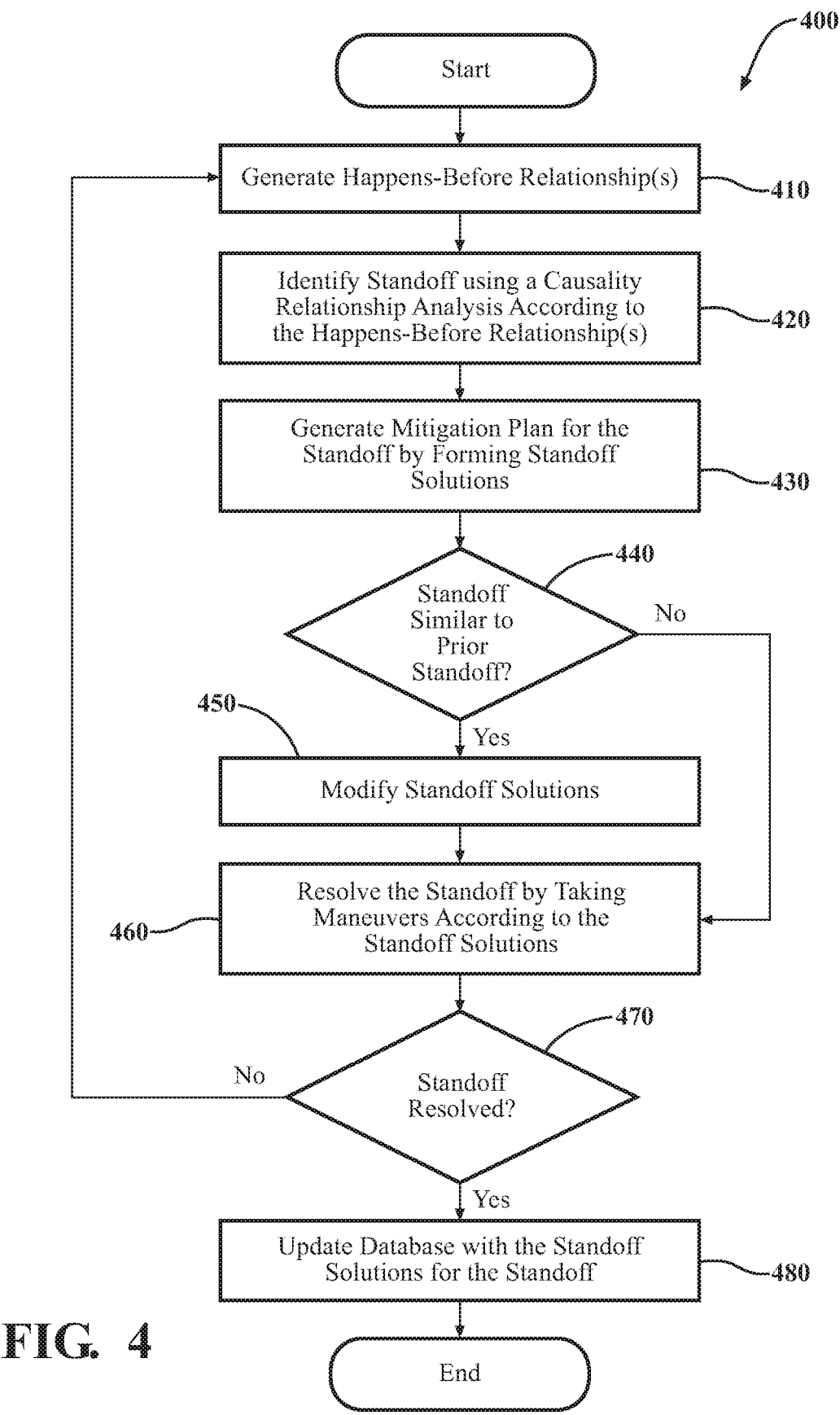
FIG. 4 illustrates one embodiment of a method that is associated with resolving a standoff between vehicles using a connected vehicle network and a causality relationship analysis associated with a happens-before relationship(s).

FIG. 4 illustrates one embodiment of a method that is associated with resolving a standoff between vehicles using a connected vehicle network and a causality relationship analysis associated with a happens-before relationship(s). Method 400 will be discussed from the perspective of the control system 170 of FIGS. 1 and 2. While method 400 is discussed in combination with the control system 170, it should be appreciated that the method 400 is not limited to being implemented within the control system 170 but is instead one example of a system that may implement the method 400.

At 410, the control module 220 generates a happens-before relationship(s) for a standoff using data collected via a connected vehicle network. As explained herein, the happens-before relationship may explain an event(s) that happened resulting in the standoff and identify a right of way for a vehicle(s). For example, an event may be a vehicle route or a maneuver. Also as explained herein, the happens-before relationship may be executed according to a clock or logical clock. Furthermore, the vehicle 100 may use the connected vehicle module 180 to form an ad-hoc network, a local-area network (LAN), a peer-to-peer (P2P) network, a micro-cloud, a vehicular micro-cloud, and so on with other vehicles involved or proximate to the standoff. In one approach, a vehicular micro-cloud may utilize a set of connected vehicles that collaborate to execute certain tasks. The collaboration may include sharing resources such as communication links, computation power, storage, and so on to create a virtual infrastructure. A vehicular micro-cloud may collaborate through V2X communications.

The connected vehicle 100 and the other vehicles in a zone of the standoff may share the extrinsic parameters 260, the intrinsic parameters 270, or the observation data 280 using the connected vehicle network to expediently resolve the standoff. In one approach, the vehicle 100 may use crowd-sourced observation data from vehicles unrelated to the standoff to reduce time to resolve the standoff due to lower correlation of data.

At 420, the analysis module 230 identifies the standoff using a causality relationship analysis according to the happens-before relationship(s). The analysis module 230 may perform identification to understand properties, features, or characteristics of the standoff and thereby find optimal solutions. The causality relationship analysis may determine patterns, sequences, and so on of events associated with the happens-before relationship(s), such as those related to the right of way, needed to resolve the standoff. In one approach, the vehicle 100 may execute the causality relationship analysis using happens-before relationships acquired through the connected vehicle network from other vehicles involved or proximate to the vehicle. In this way, the control system 170 may use relevant and applicable data in the zone of the standoff to expediently resolve the standoff.

At 430, the control system 170 or the analysis module 230 generates a mitigation plan for the standoff by forming the standoff solutions 290. As explained herein, standoff solutions may be a series of vehicle actions where each vehicle action may include any one of a driving action, a vehicle maneuver, driving maneuvers, vehicle signaling, and so on for the vehicle 100 and at least one other vehicle to resolve the standoff. For example, a vehicle action may be turn left, turn right, brake, and so on performed by an operator(s) or ADS on the road or area having parked or immobile vehicles involved in the standoff. In one approach, the standoff solutions 290 may be a tree of vehicle actions to resolve the standoff by following an adaptive path, steps, or sequence of actions. The control system 170 or the analysis module 230 may update or adapt nodes of the tree upon completion of respective ones of the vehicle actions. The control system 170 or the analysis module 230 may also update nodes of the tree using the extrinsic parameters 260, the intrinsic parameters 270, the observation data 280, and so on.

Moreover, the control system 170 or the analysis module 230 may generate the mitigation plan using the extrinsic parameters 260 or the intrinsic parameters 270. Examples of the extrinsic parameters 260 may include environmental factors such as a road geometry, a road status, an arrival time, an entry time, traffic conditions, and so on. Examples of intrinsic parameters 270 may include a driver experience level, driver hospitality, driver willingness, and so on. The extrinsic parameters 260 and the intrinsic parameters 270 may improve an application rate of the driving actions or maneuvers associated with the standoff solutions 290 thereby reducing standoffs.

In addition, the vehicle 100 and the other vehicles associated with the identified standoff may offload tasks, subtasks, and so on associated with the causality relationship analysis or generation of the mitigation plan for execution on an edge server or a cloud server. The vehicle 100 offloading processing load may reduce time to resolve the standoff. Moreover, the edge server or the cloud server may use standoff information such as a location, a road geometry with section, locale, city-wide information, or traffic flow to perform traffic impact or severity analysis associated with the standoff. In one approach, the vehicle 100 and other vehicles may use the impact or severity analysis results to further optimize or refine standoff solutions. Furthermore, the edge server or the cloud server may use the analysis results to re-route traffic and reduce congestion. Reducing the severity or the impact of the standoff location may improve driver satisfaction and prevent traffic accidents.

At 440, the control system 170 compares properties, features, or characteristics of the identified standoff to a database of prior standoffs. The control system 170 may store prior standoff solutions in a local or remote database. Each standoff solution may include results, mistakes, or rejections of vehicle actions. Prior standoff solutions may also include extrinsic and intrinsic parameters. The control system 170 may compare prior extrinsic and intrinsic parameters with the extrinsic parameters 260 and intrinsic parameters 270 to reduce standoff resolution times.

In addition, in one approach a machine learning model may adapt generated standoff solutions 290 in the database according to similarly accepted or rejected prior standoff solutions. The control system 170 may use the machine learning model to generate a tree where each node is a possible vehicle action. The machine learning model may adaptively generate a new solution in the tree according to the completion status of the vehicle action. Furthermore, the control system 170 may apply a reinforcement learning model. A reinforcement learning model may analyze a vehicle state or action and give a reward to each vehicle action. The reinforcement learning model may then decide the next vehicle action to further approach a standoff resolution.

At 450, if one or more similar prior standoff solutions are found, the control system 170 modifies the standoff solutions 290 according to the outcomes of the machine learning model or the reinforcement model. For instance, the control system 170 may modify the standoff solutions 290 with the tree of vehicle actions. In one approach, the control system 170 may adopt the standoff solutions 290 of the reinforcement learning model sequence of vehicle actions. Furthermore, the vehicle may use the connected vehicle module 180 to share the generated tree or the next vehicle action to other vehicles to expedite the resolution of the standoff.

The control system 170 may display and/or communicate the vehicle actions according to the standoff solutions 290 for the vehicle 100, other vehicles, or operators to accept or reject. At 460, if accepted, the vehicle 100, other vehicles, or operators involved in the standoff take vehicle or driving maneuvers according to the standoff solutions 290. If rejected, the control system 170 may propose other vehicle actions or restart.

At 470, the control system 170 determines the resolution of the standoff. The control system may determine that the standoff is resolved according to the travel speed of the vehicle 100 or other vehicles, movement data from the navigation system 147, observation data 280, and so on. At 480, the control system 170 updates the local or remote database of standoff solutions for the standoff associated with the resolution of the standoff. In this way, vehicle 100 or other vehicles may utilize the standoff solutions 290 for similar standoffs.

Furthermore, if the standoff is unresolved, the control system 170 may update the local or remote database of standoff solutions for the standoff. The standoff solutions 290 for the unsuccessful resolution may resolve other standoffs in different environments, train a machine learning model, and so on. Furthermore, the control system 170 may restart the method 400 when a standoff is unresolved.

Figure 5:
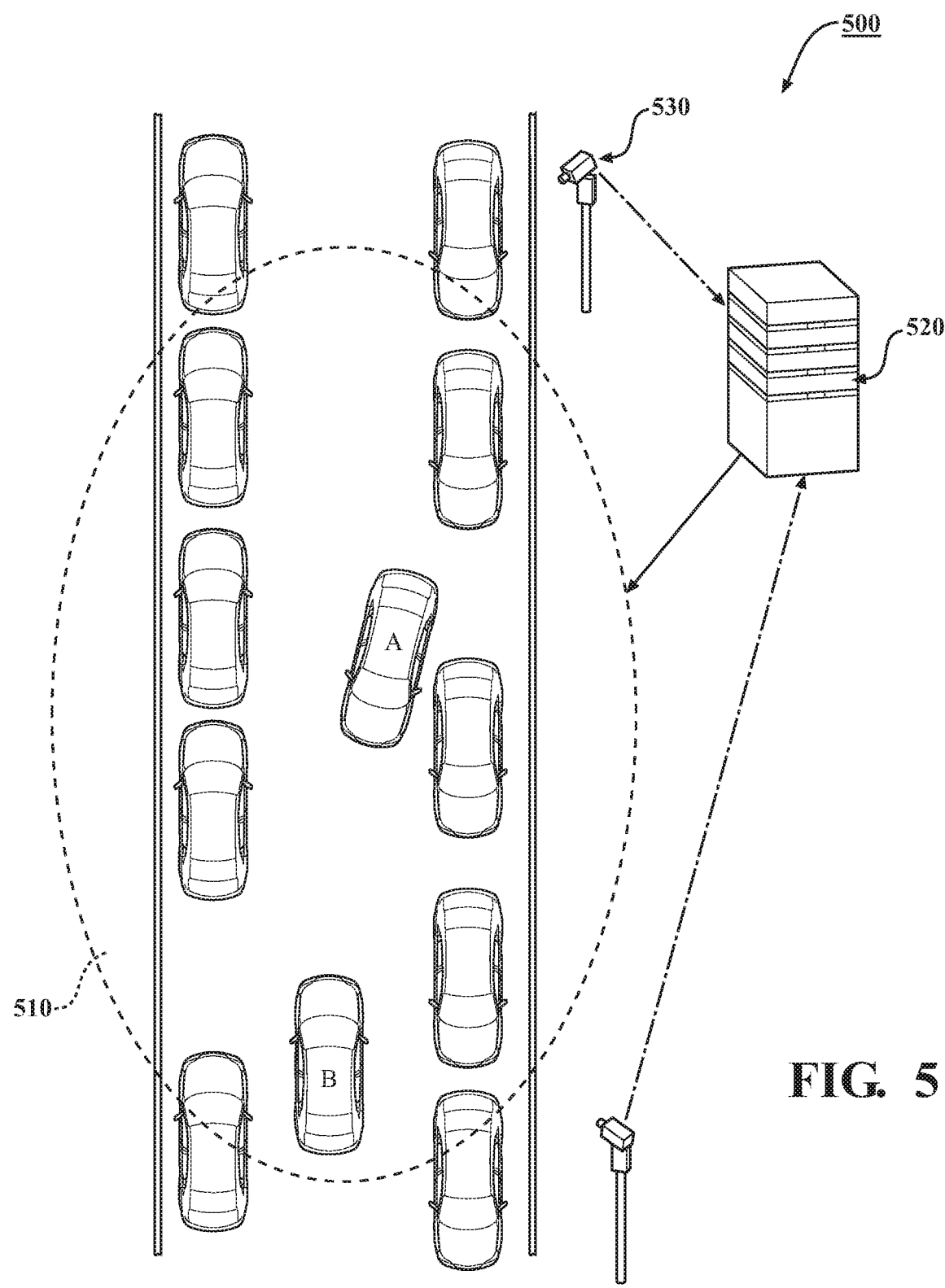
FIG. 5 illustrates one embodiment of resolving a standoff between vehicles using a connected vehicle network and server information.

FIG. 5 illustrates one embodiment of resolving a standoff between vehicles using a connected vehicle network and server information 500. Vehicles A and B may form a connected vehicle network 510 to resolve a standoff. A connected vehicle network may be an ad-hoc network, a LAN, a P2P network, a micro-cloud, a vehicular micro-cloud, and so on with other vehicles involved or proximate to the standoff. In one approach, either vehicle A or B may be a cloud leader and other nearby vehicles members of a vehicular micro-cloud. Vehicles A and B may generate standoff solutions using server information from the edge or the cloud server 520 when the extrinsic parameters 260, the intrinsic parameters 270, the observation data 280, and so on are insufficient to resolve the standoff. In one approach, vehicles A and B may use server information when the vehicular micro-cloud has insufficient information to resolve a standoff and the edge or the cloud server 520 have relevant aggregated information from cameras 530, fixed roadside units (RSUs), vehicle observation data, connected sensors, drones, base stations, and so on. In this way, vehicles A and B may form more reliable and accurate standoff solutions by leveraging crowd-sourced data.

Figure 6:
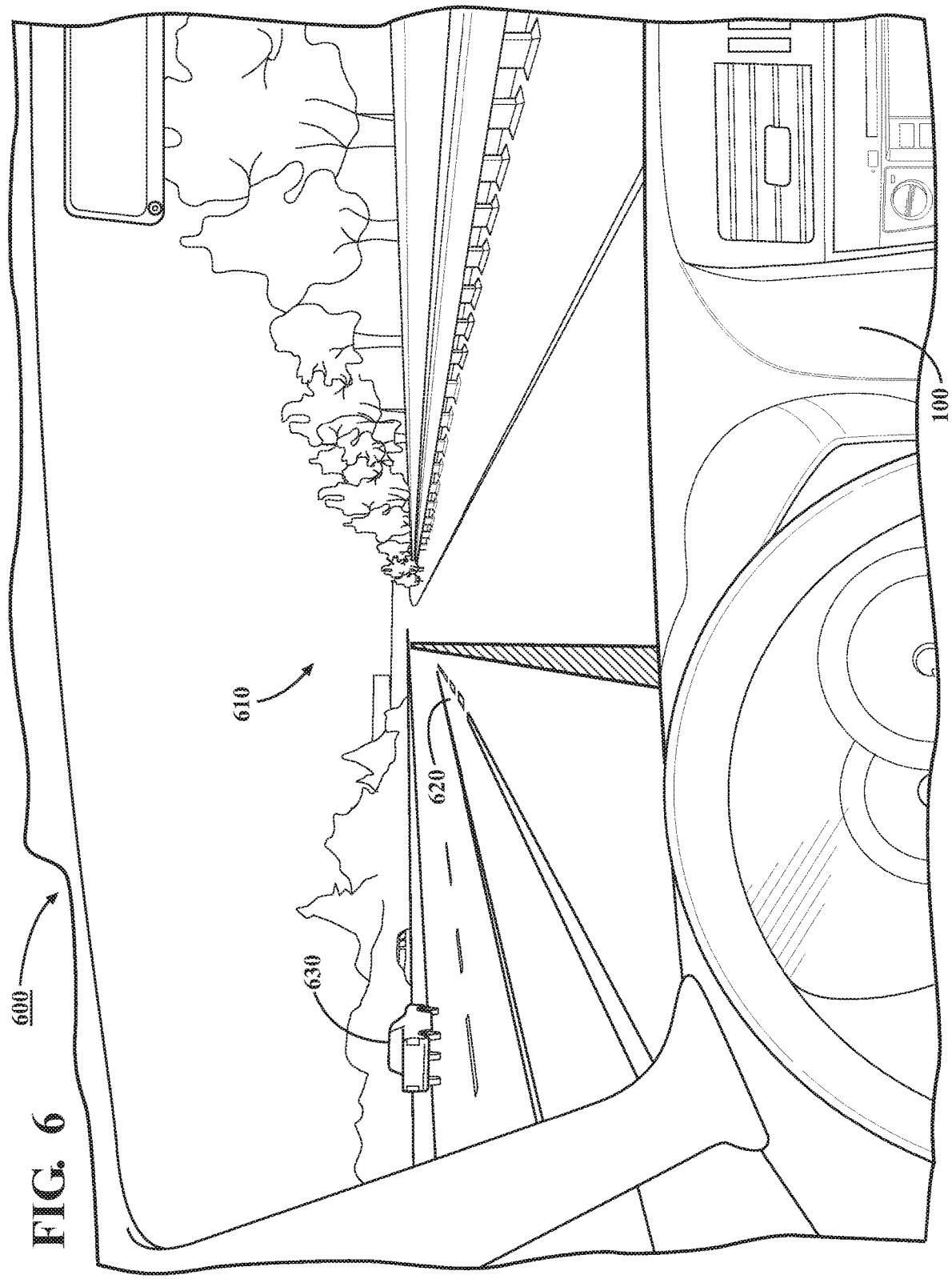
FIG. 6 illustrates a vehicle and a vehicle driving environment for generating a happens-before relationship(s) before a standoff.

Turning now to FIG. 6, the diagram illustrates a vehicle and a vehicle driving environment 600 for generating a happens-before relationship associated with a standoff. In FIG. 6, the driving environment 610 may include the vehicle 100 traveling on the road 620 with another vehicle 630. The vehicle 100 may subsequently be involved in a standoff on the road 620 with other vehicles due to traffic. The vehicle 100 may generate a happens-before relationship to resolve the standoff. As explained herein, the happens-before relationship may explain an event(s) that happened resulting in the standoff and identify a right of way for a vehicle(s).

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an automated or autonomous vehicle. As used herein, automated vehicle or "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application-specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110 and/or the automated driving module(s) 160 may control some or all of the vehicle systems 140 and, thus, may be partially or fully autonomous as defined by the society of automotive engineers (SAE) 0 to 5 levels.

The processor(s) 110 and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110 and/or the automated driving module(s) 160 can control the direction and/or speed of the vehicle 100. The processor(s) 110 and/or the automated driving module(s) 160 can cause the vehicle 100 to accelerate, decelerate ( ) and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning models. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, and so on and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A control system for resolving a standoff by a vehicle, comprising:
   one or more processors;
   a memory communicably coupled to the one or more processors and storing:
   a control module including instructions that when executed by the one or more processors cause the one or more processors to:
      generate a happens-before relationship that explains events between the vehicle and other vehicles before the standoff, wherein the standoff is a dispute for a right of way between the vehicle and the other vehicles; and
   an analysis module including instructions that when executed by the one or more processors cause the one or more processors to:
      identify the standoff using a causality relationship analysis according to the happens-before relationship having vehicle routes with temporal features associated with the standoff;
      generate a mitigation plan, using a machine learning model, for the standoff that forms standoff solutions in association with the standoff being similar to a prior standoff, the mitigation plan including a tree having node parameters that adapt to completion statuses for vehicle maneuvers associated with the standoff solutions; and
      resolve the standoff by causing the vehicle maneuvers associated with the vehicle according to the standoff solutions.

2. The control system of claim 1, wherein the analysis module includes instructions to identify the standoff further including instructions to communicate other solutions for additional causality relationship analysis associated with tasks completed with the other vehicles using a vehicular micro-cloud for the standoff.

3. The control system of claim 1, wherein the analysis module includes instructions to generate the mitigation plan further including instructions to create the tree having adaptive steps of vehicle actions performed in association with the vehicle maneuvers using the machine learning model to form the standoff solutions.

4. The control system of claim 3, wherein the analysis module further includes instructions to update the tree upon completion of respective ones of the vehicle actions and communicating the tree to the other vehicles to resolve the standoff.

5. The control system of claim 1, wherein the analysis module further includes instructions to adapt the standoff solutions using the machine learning model according to vehicle actions rejected for the prior standoff to identify additional solutions to resolve the standoff.

6. The control system of claim 1, wherein the analysis module further includes instructions to analyze vehicle actions associated with the standoff solutions using a reinforcement learning model that rewards a vehicle action and provides a next vehicle action to resolve the standoff.

7. The control system of claim 1, wherein the analysis module further includes instructions to detect the standoff associated with the other vehicles using crowd-sourced data from a connected vehicle network to reduce a time to resolve the standoff.

8. The control system of claim 1, wherein the analysis module further includes instructions to collect additional data from the other vehicles, connected devices, an edge server, or a cloud server associated with a connected vehicle network on a condition that the standoff is unresolved and instructions to update a database with the standoff solutions according to the additional data.

9. A non-transitory computer-readable medium for resolving a standoff by a vehicle and including instructions that when executed by one or more processors cause the one or more processors to:
   generate a happens-before relationship that explains events between the vehicle and other vehicles before the standoff, wherein the standoff is a dispute for a right of way between the vehicle and the other vehicles;
   identify the standoff using a causality relationship analysis according to the happens-before relationship having vehicle routes with temporal features associated with the standoff;
   generate a mitigation plan, using a machine learning model, for the standoff that forms standoff solutions in association with the standoff being similar to a prior standoff, the mitigation plan including a tree having node parameters that adapt to completion statuses for vehicle maneuvers associated with the standoff solutions; and
   resolve the standoff by causing the vehicle maneuvers associated with the vehicle according to the standoff solutions.

10. The non-transitory computer-readable medium of claim 9, wherein the instructions to identify the standoff further include instructions to communicate other solutions for additional causality relationship analysis associated with tasks completed with the other vehicles using a vehicular micro-cloud for the standoff.

11. The non-transitory computer-readable medium of claim 9, wherein the instructions to generate the mitigation plan further include instructions to create the tree having adaptive steps of vehicle actions performed in association with the vehicle maneuvers using the machine learning model to form the standoff solutions.

12. The non-transitory computer-readable medium of claim 11 further including instructions that when executed by the one or more processors cause the one or more processors to update the tree upon completion of respective ones of the vehicle actions and communicating the tree to the other vehicles to resolve the standoff.

13. A method for resolving a standoff by a vehicle, the method comprising:

generating a happens-before relationship that explains events between the vehicle and other vehicles before the standoff, wherein the standoff is a dispute for a right of way between the vehicle and the other vehicles;

identifying the standoff using a causality relationship analysis according to the happens-before relationship having vehicle routes with temporal features associated with the standoff;

generating a mitigation plan, using a machine learning model, for the standoff that forms standoff solutions in association with the standoff being similar to a prior standoff, the mitigation plan including a tree having node parameters that adapt to completion statuses for vehicle maneuvers associated with the standoff solutions; and resolving the standoff by causing the vehicle maneuvers associated with the vehicle according to the standoff solutions.

14. The method of claim 13, wherein identifying the standoff further comprises communicating other solutions for additional causality relationship analysis associated with tasks completed with the other vehicles using a vehicular micro-cloud for the standoff.

15. The method of claim 13, wherein generating the mitigation plan further comprises creating the tree having adaptive steps of vehicle actions performed in association with the vehicle maneuvers using the machine learning model to form the standoff solutions.

16. The method of claim 15, further comprising:

updating the tree upon completion of respective ones of the vehicle actions and communicating the tree to the other vehicles to resolve the standoff.

17. The method claim 13, further comprising:

adapting the standoff solutions using the machine learning model according to vehicle actions rejected for the prior standoff to identify additional solutions for resolving the standoff.

18. The method claim 13, further comprising:

analyzing vehicle actions associated with the standoff solutions using a reinforcement learning model that rewards a vehicle action and provides a next vehicle action to resolve the standoff.

19. The method of claim 13, further comprising:

detecting the standoff associated with the other vehicles using crowd-sourced data from a connected vehicle network to reduce a time to resolve the standoff.

20. The method of claim 13, further comprising:

collecting additional data from the other vehicles, connected devices, an edge server, or a cloud server associated with a connected vehicle network on a condition that the standoff is unresolved; and updating a database with the standoff solutions according to the additional data.

\* \* \* \* \*